United States Patent

[11] 3,554,110

| | | |
|---|---|---|
| [72] | Inventor | Hans Goetz<br>Sindelfingen, Germany |
| [21] | Appl. No. | 799,230 |
| [22] | Filed | Feb. 14, 1969 |
| [45] | Patented | Jan. 12, 1971 |
| [73] | Assignee | Daimler-Benz Aktiengesellschaft,<br>Stuttgart-Unterturkheim, Germany |
| [32] | Priority | Feb. 16, 1968 |
| [33] | | Germany |
| [31] | | No. 1,680,018 |

[54] VENTILATION SYSTEM FOR PASSENGER MOTOR VEHICLE
8 Claims, 3 Drawing Figs.

[52] U.S. Cl. .................................................. 98/2
[51] Int. Cl. .................................................. B60h 1/00
[50] Field of Search ..................................... 98/2, 2.1, 2.7(Inquired), 296

[56] References Cited
UNITED STATES PATENTS

| 3,059,561 | 11/1962 | Wilfert ........................ | 98/2 |
| 3,259,051 | 7/1966 | Boche ......................... | 98/2 |
| 3,263,591 | 8/1966 | Finch .......................... | 98/2 |
| 3,357,338 | 12/1967 | Pollack....................... | 98/2 |

Primary Examiner—Meyer Perlin
Attorney—Craig, Antonelli, Stewart and Hill

ABSTRACT: A motor vehicle, especially a passenger motor vehicle, in which a rainwater deflector or the like is arranged along the edge of the roof to prevent rainwater from flowing off over the side windows, and which is equipped with a ventilation system for the passenger space that includes apertures provided in the outer body surface of the rear column directly to the rear of the rainwater deflector; the space within each rear column which forms a part of the air guidance channel for the ventilation system is thereby subdivided by a partition wall extending over a part of its height.

INVENTOR
HANS GÖTZ

VENTILATION SYSTEM FOR PASSENGER MOTOR VEHICLE

The present invention relates to a motor vehicle, especially a passenger motor vehicle, with an installation for the ventilation of the passenger space and with channel-shaped rain deflectors extending along the roof edge of the vehicle and preferably delimiting upper part of the side windows.

A draft-free ventilation of the passenger space of the vehicle is achieved for a motor vehicle of the type described above in that at the columns supporting the roof, apertures are provided in the outer panels of the body within the area disposed directly to the rear of the rainwater deflector as viewed in a driving direction, which apertures connect the passenger space with the free atmosphere surrounding the vehicle.

With the a passenger space ventilation of the aforementioned type, either water discharge apertures or slots had to be provided heretofore within the area of the body floor or of the wheel casings of the rear wheels in order to be able to drain the water entering through the ventilation openings.

However, it has been found that such types of water discharge openings or slots can become clogged up after a longer period of operation of a vehicle by dirt that has penetrated so that a completely satisfactory water drainage can no longer be assured and the danger of rust-formation at the corresponding body parts arises.

The present invention is therefore concerned with avoiding these disadvantages and with creating a passenger space ventilation of the aforementioned type in which, in all cases, a completely satisfactory water discharge is assured.

Accordingly, a motor vehicle is proposed, especially a passenger motor vehicle, with an installation for the ventilation of the passenger space and with channel-shaped rainwater deflectors or the like extending along the roof edge and preferably delimiting the upper portion of the side windows whereby openings are provided in the outer surface of the body at the rear columns supporting the roof within the area that is disposed directly to the rear of the rainwater deflector as viewed in the driving direction, which openings connected the passenger spaced with the free atmosphere surrounding the vehicle whereby according to the present invention the free space on the inside of each rear column is subdivided in its lower area by a partition wall into two channels, of which the channel disposed to the rear in the driving direction is in communication with the passenger space and the channel disposed in front in the driving direction and serving for the water drainage, terminates approximately at the height of the bottom edge of the lowermost aperture in the outer panel of the body whereby the partition wall forming its bottom extends inclined in the direction toward the aperture.

By such a type of construction it is achieved that water penetrating through the apertures in the outer surface of the body, is collected in the forward channel and flows off into the atmosphere through the lowermost aperture.

With motor vehicles having a sliding roof it is possible thereby to extend the water discharge hoses of the sliding roof guidance only up to this channel, whereas heretofore a further extension of these hoses was necessary up to the area of the wheel casings or of the body floor.

According to a preferred type of construction of the present invention a spray-water protection consisting, for example, of coarse-pored skeleton foam of any conventional known type is arranged at least within the area above the partition wall.

It is achieved by such a type of spray-water protection that also with sharp water jets penetrating through the apertures, no water can enter into the channel connected with the passenger space.

Finally, it may be advantageous to provide within the area of the apertures, a profile secured at the outer panel of the body and covering the apertures, for example, in the form of a decorative rod.

The portion of such a profile disposed to the rear as viewed in the driving direction, then acts as accelerating edge whereby the vacuum within the area of the ventilating apertures is still further increased.

Accordingly, it is an object of the present invention to provide a motor vehicle, especially a passenger motor vehicle, with a ventilation system which avoids by simple means the aforementioned shortcomings and drawbacks encountered in the prior art.

Another object of the present invention resides in a passenger motor vehicle of the type described above in which a completely satisfactory drainage of the water collected by the lateral rainwater deflectors or the like is assured at all times, notwithstanding the presence of ventilation apertures in the outer body surface within the area of the rear columns of the top.

A still further object of the present invention resides in motor vehicles, especially a passenger motor vehicle, provided with a ventilation system terminating within the rear seats of the passengers in which the penetration of rainwater is effectively precluded by simple means.

Another object of the present invention resides in a ventilation system for passenger motor vehicles consisting of apertures in the outer body panels within the area of the rear column supporting the roof, which not only effectively protects the passenger space against the penetration of water collected by the roof moldings, but also protects the passenger space against the penetration of water produced by powerful water jets, for example, as may be used in washing the car.

These and further object, features, and advantages of the present invention will become more obvious from the following description when taken in connection with the accompanying drawing, which shows, for purposes of illustration only, two embodiments in accordance with the present invention, and wherein.

Figure 1:
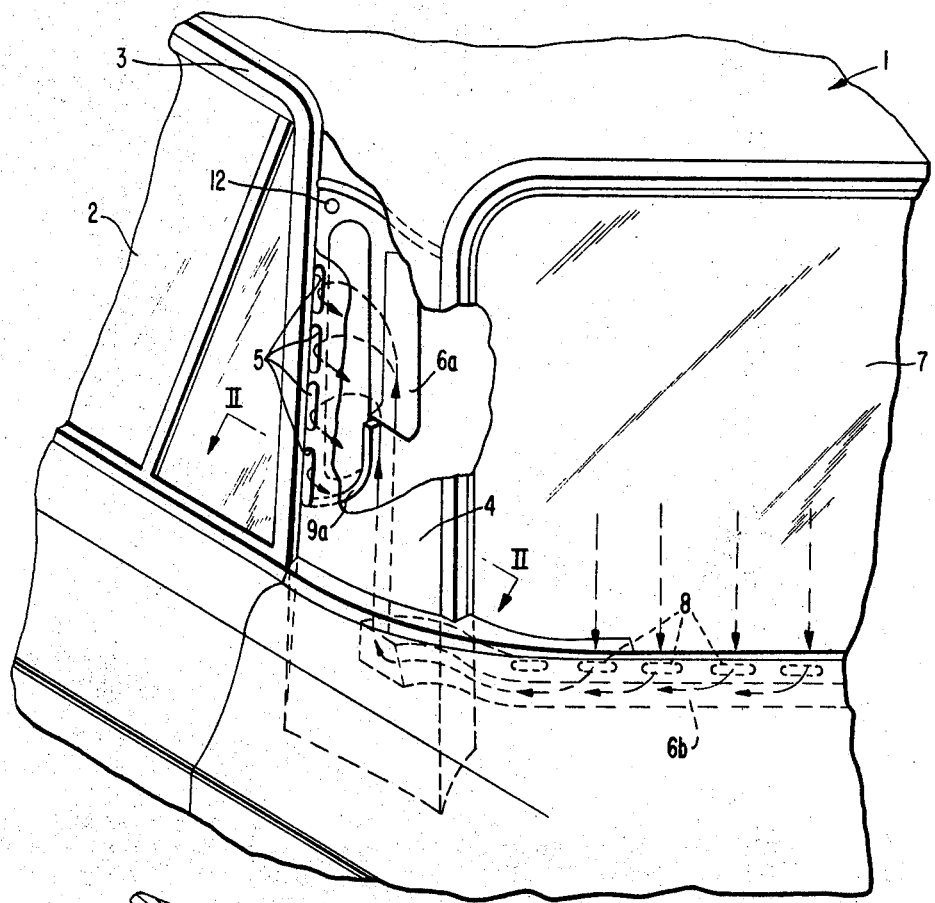
FIG. 1 is a partial perspective view, partly in cross section, of a rear column of a passenger motor vehicle in accordance with the present invention.

Referring now to the drawing wherein like reference numerals are used throughout the various views to designate like parts, and more particularly to FIG. 1, the passenger motor vehicle illustrated in this FIG. includes a vehicle roof 1 and a rainwater deflector or molding 3 placed at the edge of the roof 1 about the upper portion of the side window 2, which is constructed channel shaped and is intended to prevent the water, flowing off from the roof 1 during a rain flow-off by way of the side windows 2. Several apertures 5 are provided at the rear column 4 within the area directly to the rear of the rain deflector 3 in the outer panel or cover of the body, which apertures are in communication with the interior space of the vehicle. This communication results from a channel 6 serving as the air-guide channel which includes a section 6a extending on the inside of the rear column 4 and a section 6b extending approximately horizontally below the rear window 7 and terminating by way of apertures 8 in the interior space of the vehicle.

The free space of the inside of the rear column 4 is subdivided into two channels over a part of its height by a partition wall 9, and more particularly into the channel 6a serving for the air-conduction and into a second channel 10 which serves for the collection and discharge of the water entering through the openings 5. The channel 10 therefore terminates at the height of the lower edge of the lowermost aperture 5 whereby the part 9a of this partition wall 9 forming its lower boundary extends at an inclination in the direction toward this aperture 5 in order to assure a completely satisfactory water drainage. The sealing of this partition wall 9 with respect to the outer panel of the body takes place by means of a conventional seal 11.

The partition wall 9 extends only over a part of the height of the free space on the inside of the rear column 4 so that its upper section constitutes a connection of the two channels 6a and 10.

In motor vehicles with a sliding roof, the drainage of the sliding roof guide means can terminate at the place 12 because the water, that has penetrated, drains off from there through the channel 10 by way of the apertures 5.

Figure 2:
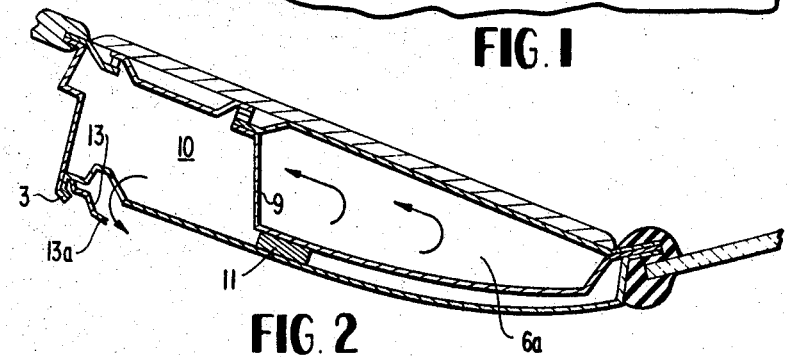
FIG. 2 is a cross-sectional view, on an enlarged scale, taken along line II–II of FIG. 1.
Figure 3:
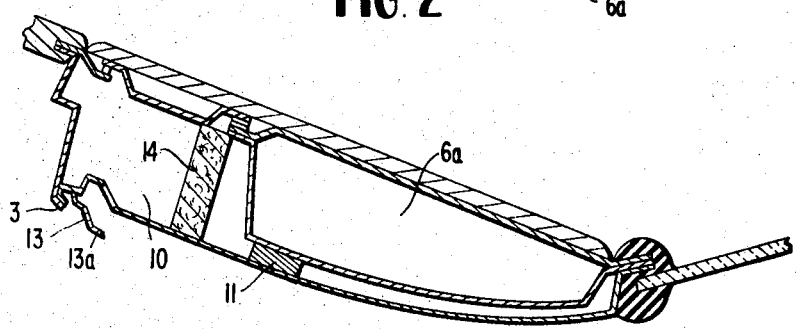
FIG. 3 is a cross-sectional view, similar to FIG. 2, through a modified embodiment of a passenger motor vehicle in accordance with the present invention, provided with additional spray-water protecting means.

For the purpose of increasing the vacuum within the area of the apertures 5, a profile 13 is provided as illustrated in FIGS. 2 and 3 whose rear portion 13a acts as accelerating edge. Possibly occurring ventilating noises may be avoided thereby by an appropriate configuration of the profile 13.

In the embodiment according to FIG. 3, a spray-protection 14 is provided which, for example, may consist of a coarse-pored skeleton foam of any conventional type and which is intended to prevent that sharp water jets as may occur, for example, during the washing of the vehicle, are able to enter into the channel 6a by way of the apertures 5.

OPERATION

The operation of the ventilation system in accordance with the present invention is as follows:

Since a strong vacuum region forms during the drive to the rear of the rainwater deflector 3 and to the rear of the profile 13, air flows out of the passenger space in the direction of the arrows indicated in the drawing along the inner side of the rear window 7 through the apertures 8 into the channel 6, from there above the partition wall 9 into the channel 10, and finally through the apertures 5 into the atmosphere.

While I have shown and described only two embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are within the scope of those skilled in the art.

I claim:

1. A motor vehicle, especially a passenger motor vehicle, with a ventilation system for ventilating the passenger space and with rainwater deflector means extending along the roof edge of the vehicle and preferably delimiting the upper portions of the side windows, in which apertures are provided in the outer panels of the body at the rear columns supporting the roof within the area disposed directly to the rear of the rainwater deflector means, as viewed in the driving direction, which apertures connect the passenger space with the free atmosphere surrounding the vehicle, characterized in that the free space on the inside of each rear column is subdivided within its lower area into two channels by a partition wall, the channel disposed to the rear, as viewed in the driving direction, being in communication with the passenger space and the channel disposed in front, as viewed in the driving direction, serving as water discharge channel that terminates approximately at the height of the lower edge of the lowermost aperture, the partition wall forming the bottom of said second-mentioned channel, and said bottom extending inclined in the direction toward said aperture.

2. A motor vehicle according to claim 1, further comprising spray-water protection means arranged at least within the area above the partition wall.

3. A motor vehicle according to claim 2, wherein said protection means consists of a coarse-pored skeleton foam element.

4. A motor vehicle according to claim 2, further comprising profile means secured at the outer surface of the body within the area of the apertures and at least partly covering the same.

5. A motor vehicle according to claim 4, wherein said profile means is in the form of a decorative bar.

6. A motor vehicle according to claim 1, further comprising profile means secured at the outer surface of the body within the area of the apertures and at least partly covering the same.

7. A motor vehicle according to claim 6, wherein said profile means is in the form of a decorative bar.

8. A motor vehicle according to claim 6, further comprising screen means between the outer surface of the rear column and the profile means.